March 15, 1955     H. J. RECK     2,704,146
FEEDING MECHANISM FOR EGGS

Filed March 26, 1952     4 Sheets-Sheet 1

Inventor
Herbert J. Reck
By Wallenstein & Spangenberg attys.

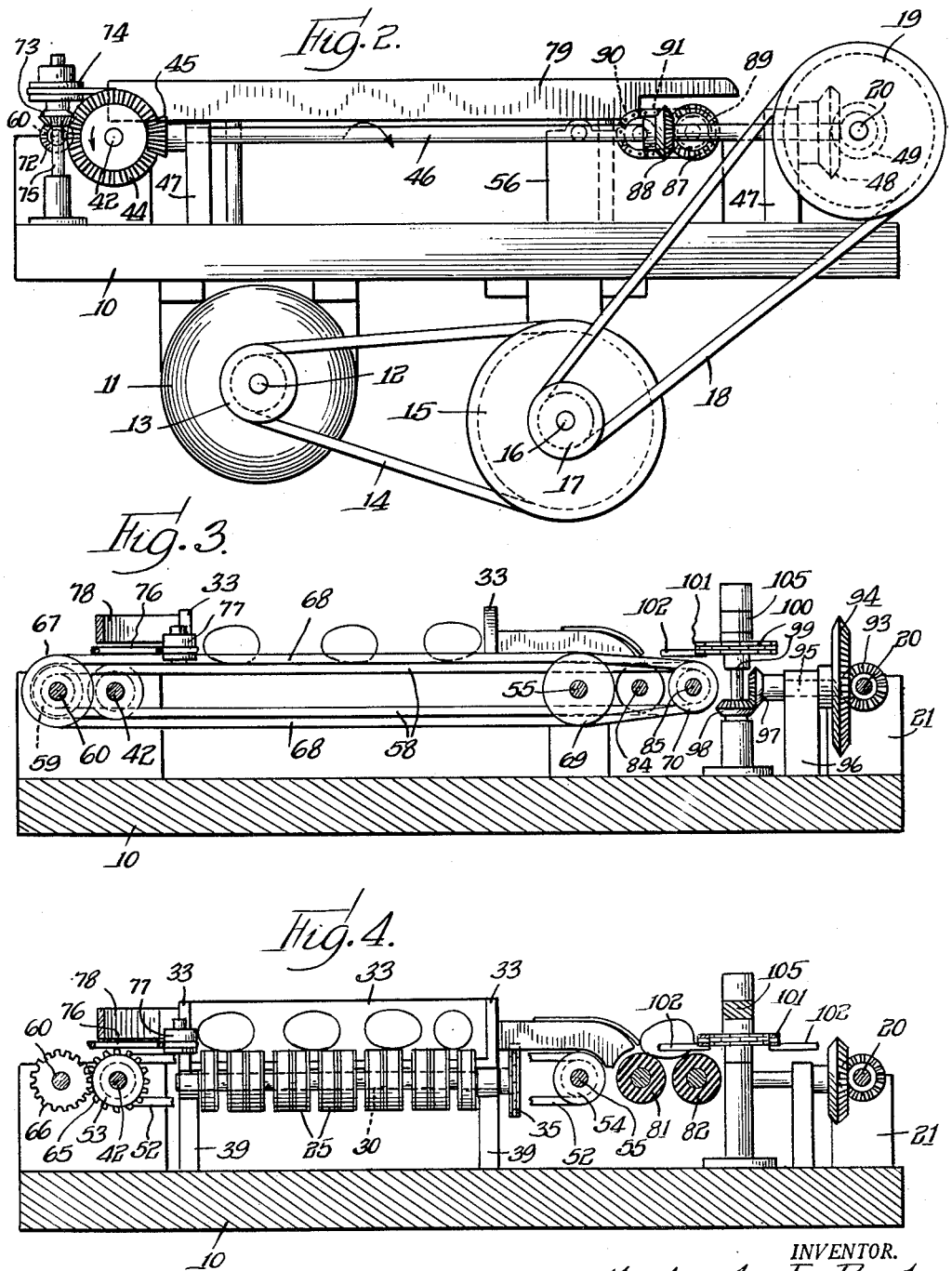

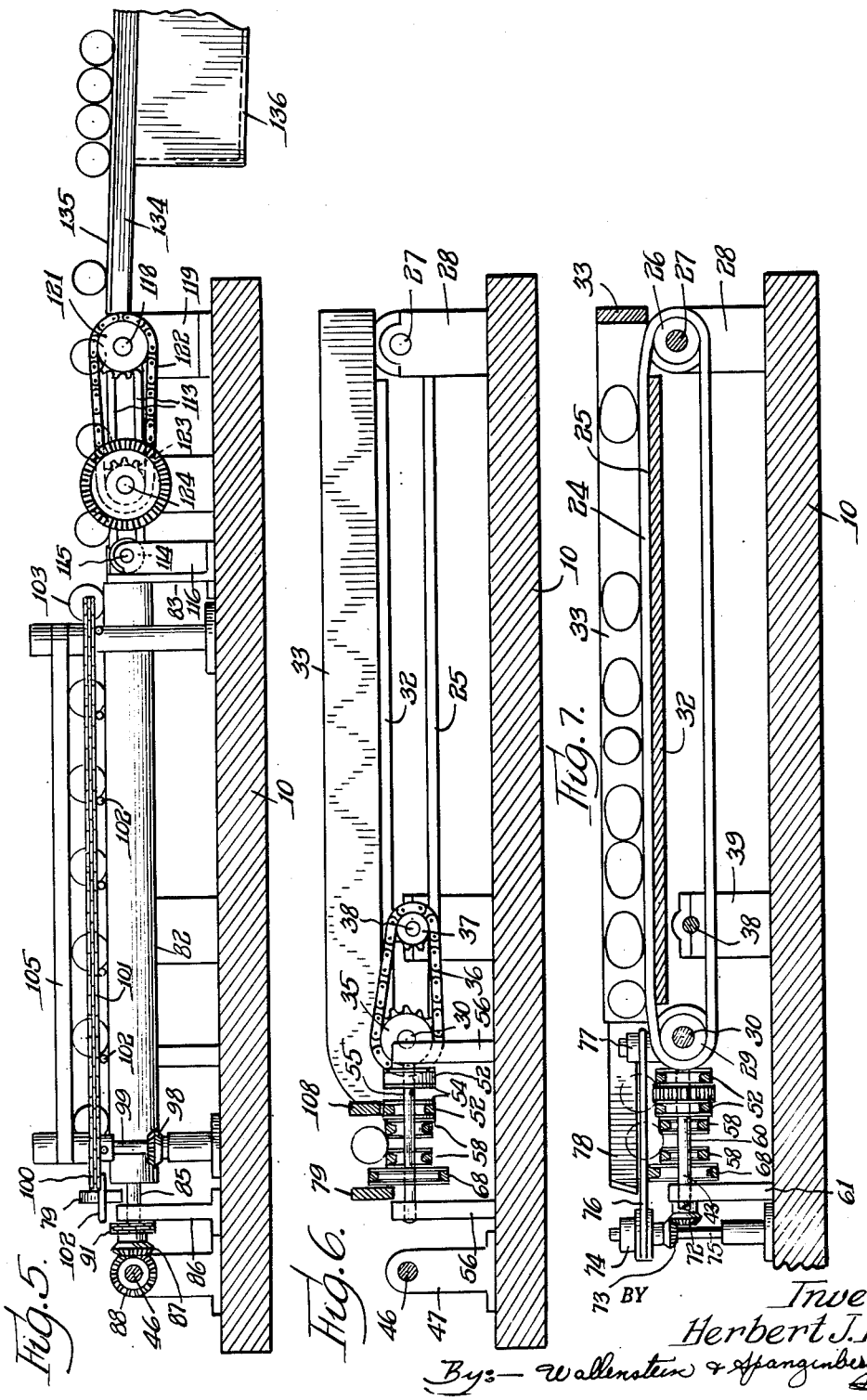

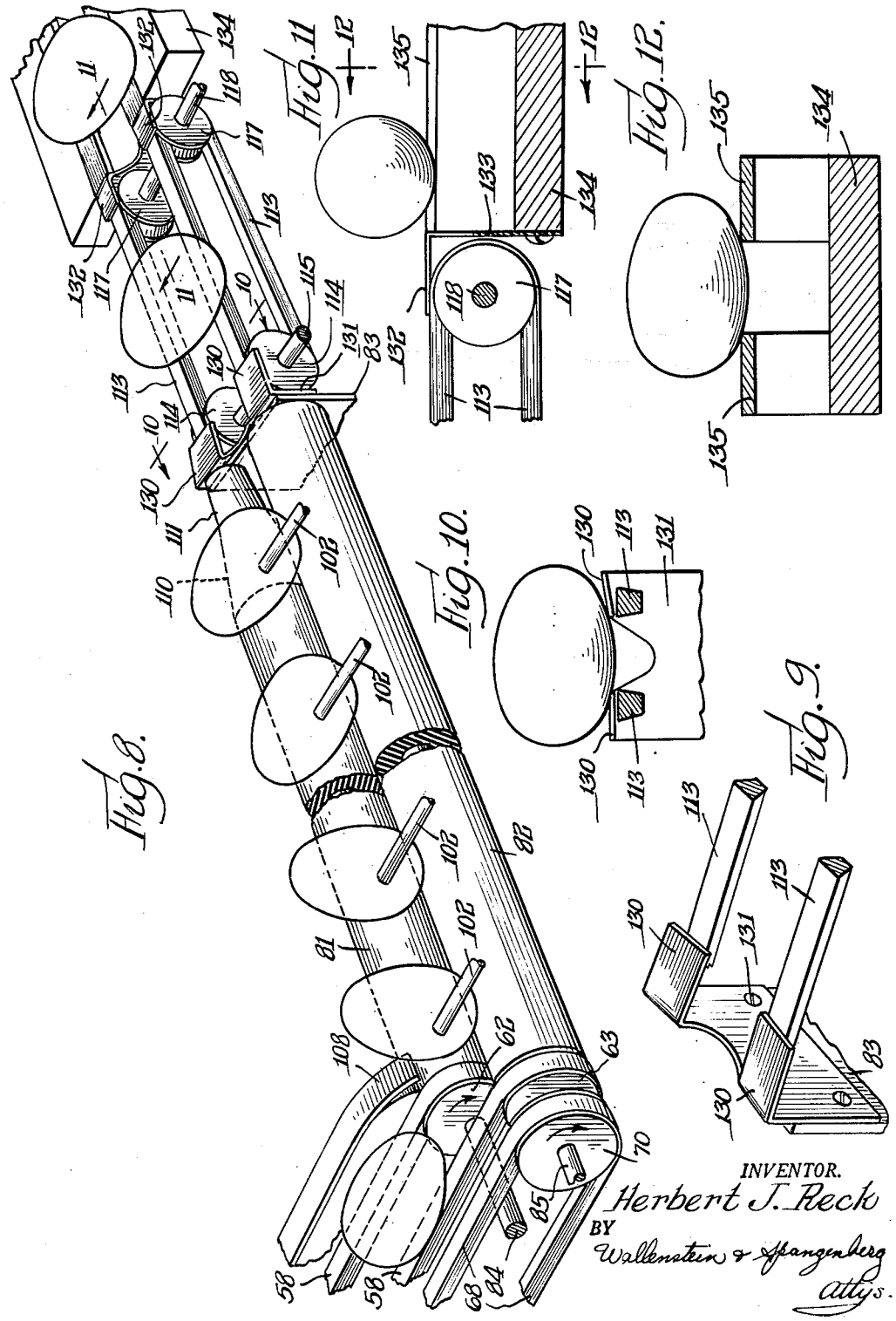

United States Patent Office 2,704,146
Patented Mar. 15, 1955

2,704,146

FEEDING MECHANISM FOR EGGS

Herbert J. Reck, Elgin, Ill.

Application March 26, 1952, Serial No. 278,670

14 Claims. (Cl. 198—30)

This invention relates to a mechanism for feeding eggs, such a mechanism being particularly adaptable for randomly receiving eggs in the bulk and then feeding such eggs in desired position one at a time to an egg candling device, a grader, a breaker or the like.

In the past it has been usual manually to handle the eggs in arranging the eggs for purposes of candling, grading, breaking or the like. For example, in candling eggs, the candling expert would handle eggs directly from the bulk, which is a slow and tedious procedure, or else the eggs would be supplied to him in regular fashion by a number of assistants. In either event, labor costs in handling and candling the eggs have been very high.

The principal object of this invention is to provide an improved mechanism wherein eggs are automatically taken from the bulk, arranged in single file with the long axes of the eggs arranged in parallel and conveyed in this fashion to suitable devices for candling, grading, breaking or the like, wherein large numbers of eggs may be so handled in an efficient and speedy manner, wherein labor costs in handling the eggs are greatly reduced, wherein manual candling of large numbers of eggs may be rapidly accomplished by a candling expert and a single assistant, the assistant merely feeding eggs in the bulk to the egg feeding mechanism, wherein costs of manufacture, installation and maintenance are kept at a minimum, and wherein the construction and operation thereof is simple and foolproof.

Briefly, the egg feeding mechanism of this invention includes a moving platform upon which large quantities of eggs from the bulk are randomly placed. A conveyor receives eggs from the downstream end of the moving platform and conveys the received eggs in single file to one end of an egg spinning and tilting device. This device, regardless of the positions of the eggs conveyed thereto, tilts the eggs to uniform positions wherein their long axes are substantially horizontal and parallel, the eggs being discharged from the other end of this device in such uniform positions and in single file. The eggs are then conveyed in these uniform positions to a candling device, grader, breaker or the like. In the case of candling, the eggs may be rolled along a track having parallel rails over a light source where they may be candled in their passage by a candling expert. Only one assistant is needed for randomly supplying eggs in the bulk to the moving platform.

The moving platform preferably includes a plurality of parallel moving belts and the conveyor at the end of the moving platform preferably includes two pairs of parallel belts, each pair running in opposite directions, with a transfer device for transferring eggs from one pair of belts to the other pair. The spinning and tilting device preferably includes a pair of cylindrical, parallel and adjacent rollers substantially horizontally arranged and means for advancing the eggs along the rollers from the supply end to the discharge end. The eggs are spun as they are advanced along the rollers and assume uniform tilted positions as they approach the discharge end of the pair of rollers. One of the rollers at its discharge end is provided with a taper for tilting the eggs to uniform positions as they leave the rollers wherein their long axes are horizontal and at right angles to their direction of movement. The eggs in these uniform positions are preferably conveyed to the track or similar device by a pair of parallel moving belts.

Further objects of this invention reside in the details of construction of the feeding mechanism of this invention and in the cooperative relationships between the component parts thereof.

Other objects and advantages of this invention will become apparent to those skilled in the art upon reference to the accompanying specification, claims and drawings, in which:

Fig. 2 is an end elevational view taken from the left of Fig. 1;

Fig. 3 is a vertical sectional view taken substantially along the line 3—3 of Fig. 1;

Fig. 4 is a vertical sectional view taken substantially along the line 4—4 of Fig. 1;

Fig. 5 is a vertical sectional view taken substantially along the line 5—5 of Fig. 1;

Fig. 6 is a vertical sectional view taken substantially along the line 6—6 of Fig. 1;

Fig. 7 is a vertical sectional view taken substantially along the line 7—7 of Fig. 1;

Fig. 8 is an enlarged perspective view of the egg spinning and tilting device shown in plan view in Fig. 1;

Fig. 9 is a perspective view of a guide member utilized at the discharge end of the egg spinning and tilting device;

Fig. 10 is a sectional view taken substantially along the line 10—10 of Fig. 8;

Fig. 11 is a sectional view taken substantially along the line 11—11 of Fig. 8; and Fig. 12 is a sectional view taken substantially along the line 12—12 of Fig. 11.

Figure 1:
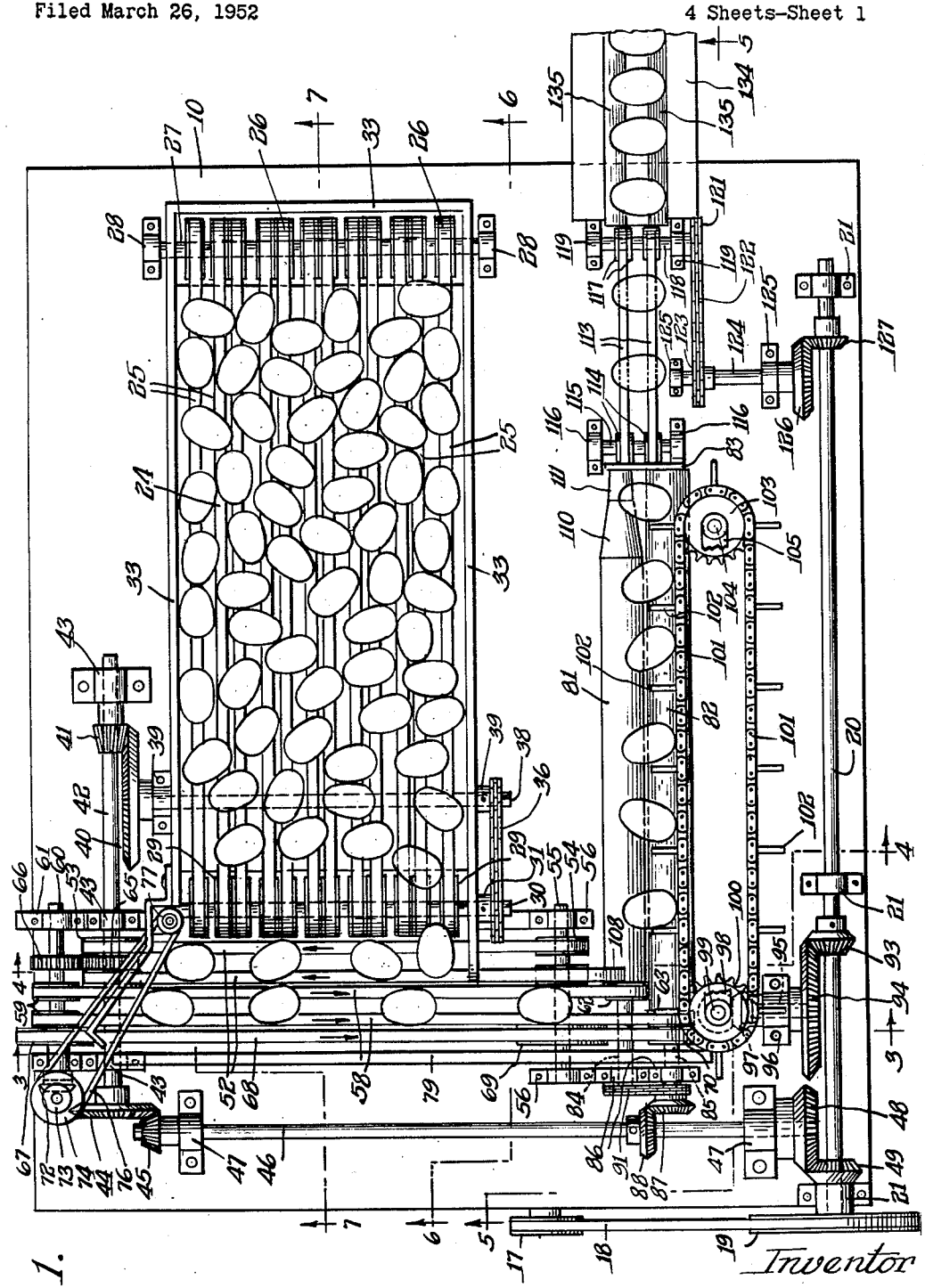
Fig. 1 is a top plan view of the feeding mechanism of this invention.

Referring more particularly to Figs. 1 and 2, the egg feeding mechanism of this invention includes a substantially horizontal base 10. A motor 11 is secured to the bottom of the base 10 and its shaft 12 drives a pulley 13 which in turn is connected by a belt 14 to a pulley 15 mounted on a shaft 16 suitably journalled from the base 10. The shaft 16 also carries a pulley 17 which operates through a belt 18 for driving a pulley 19 carried by a shaft 20 which is journalled for rotation above the base 10 by means of bearings 21. This mechanism so far described forms the power drive for the egg feeding mechanism.

As shown more particularly in Figs. 1, 4 and 7, the egg feeding mechanism includes a moving platform 24 in the form of a plurality of parallel and closely arranged belts 25. The belts 25 are carried by pulleys 26 which are in turn mounted on a shaft 27 supported by bearings 28 and by pulleys 29 mounted on a shaft 30 journalled in bearings 31. The under side of the top portions of the belts 25 contact a plate 32 for the purpose of supporting the belts. Side walls 33 are located about three sides of the moving platform 24, these side wall extending upwardly beyond the belts 25. A large number of eggs are randomly applied to the top of the moving platform 24 from a bulk supply of eggs and as the belts 25 are advanced, the eggs are fed to the left as illustrated in Figs. 1 and 7.

The belts 25 forming the moving platform 24 are driven by rotating the shaft 30. In this connection, the shaft 30 carries a sprocket wheel 35, as shown in Figs. 1 and 6, which is connected by a chain 36 to a sprocket wheel 37 carried on a shaft 38 rotatably supported by bearings 39. The shaft 38 carries a bevel gear 40 which is driven by a bevel gear 41 carried by a shaft 42 mounted in bearings 43. The shaft 42 also carries a bevel gear 44 which is driven by a bevel gear 45 mounted on a shaft 46 supported by bearings 47. The shaft 46 also carries a bevel gear 48 meshing with a bevel gear 49 carried and driven by the shaft 20. Through these gearing connections the moving platform 24 is continuously driven toward the left, as illustrated in Figs. 1 and 7.

The eggs so advanced by the moving belts 25 of the moving platform 24 fall upon a pair of parallel belts 52 extending transversely of the belts 25 at the downstream end of the moving platform 24. As shown more particularly in Figs. 1, 3, 4, 6 and 7, the pair of belts 52 are carried by a pair of pulleys 53 secured to the shaft 42 and by a pair of pulleys 54 carried by an idler shaft 55 supported in bearings 56. The pair of belts 52 are driven by the shaft 42 to convey the eggs thereon toward the shaft 42.

Another pair of parallel belts 58 are located adjacent the pair of belts 52, these belts 58 being carried by a pair of pulleys 59 secured to a shaft 60 journalled in bearings 61. One of the belts 58 is carried by an idler pulley 62 and the other by an idler pulley 63. A gear 65, carried by the shaft 42, meshes with a gear 66 carried by the shaft 60 so that as the shaft 42 is rotated in one direction the shaft 60 is rotated in the opposite direction. As a result, the belts 58 move in a direction opposite to the belts 52, the belts 58 moving toward the idler pulleys 62 and 63. A third belt 68 is mounted adjacent the pair of belts 58, the belt 68 being supported by a pulley 67 carried by the shaft 60 and extends over an idler pulley 69 carried by the idler shaft 55 onto an idler pulley 70. The pulleys 67 and 69 are somewhat larger than the pulleys 59, 62 and 63 so that the belt 68 extends upwardly beyond the pair of belts 58 for maintaining the eggs on the pair of belts 58. The linear speed of the belt 68 is greater than the linear speeds of the pair of belts 58, so that the belt 68 tends to align longitudinally the eggs on the pair of belts 58.

The shaft 60, driven by the gear 66, also carries a bevel gear 72 which meshes with a bevel gear 73 mounted on a vertical shaft 75. This vertical shaft 75 carries a pulley 74 for driving a belt 76, which is also carried by a pulley 77. The belt 76 extends over the two pairs of belts 52 and 58 and the raised belt 68 for transferring eggs from the pair of belts 52 to the pair of belts 58. A guide member 78, substantially parallel to the belt 76, assists the belt 76 in transferring the eggs from the pair of belts 52 to the pair of belts 58. A partition 79 is supported adjacent the belt 68 to assist in guiding the eggs as they are conveyed by the pair of belts 58. The two pairs of belts 52 and 58 and their associated mechanism, therefore, operate as a conveyor for conveying eggs in single file from the downstream end of the moving platform 24.

The feeding mechanism of this invention also includes an egg spinning and tilting device including a pair of cylindrical, parallel and adjacent rollers 81 and 82, which are substantially horizontally arranged. The discharge ends of the rollers 81 and 82 are journalled in a bracket 83 carried by the base 10. The supply ends of the rollers 81 and 82 are carried by shafts 84 and 85, respectively, which in turn are journalled in bearings 86. The shaft 85 carries a bevel gear 87 meshing with a bevel gear 88 carried by the shaft 46 for imparting rotation to the roller 82. The shaft 85 carries a sprocket wheel 89, which is connected by a chain 91 to a sprocket wheel 90 carried by the shaft 84. This chain operates to drive the roller 81 in the same direction as the roller 82. The pulley 62 for one of the belts 58 is rotatably mounted on the shaft 84 and the pulleys 63 and 70 for the other belt 58 and the belt 68 are rotatably mounted on the shaft 85. The eggs being conveyed in single file by the pair of belts 58 are conveyed onto the supply end of the pair of rollers 81 and 82.

The shaft 20 also carries a bevel gear 93 meshing with a bevel gear 94 carried by a shaft 95 journalled by a bearing 96. The shaft 95 also drives a bevel gear 97 which meshes with a bevel gear 98 secured to a vertical shaft 99. This vertical shaft 99 carries a sprocket wheel 100 for driving a chain 101, provided with a plurality of ears or pushers 102. The chain 101 is also carried by a sprocket wheel 103 mounted on a vertical shaft 104. The outer ends of the vertical shafts 99 and 104 are braced by a support 105. As the chain is driven the ears or pushers 102, carried thereby, operate to convey the eggs along the pair of rotating rollers 81 and 82. A guide 108, adjacent the pulley 62, assists in guiding the eggs from the pair of belts 58 onto the pair of rotating rollers 81 and 82 to be conveyed along the rollers by the ears or pushers of the sprocket chain.

The eggs conveyed onto the inlet end of the rollers 81 and 82 may assume any position. As the eggs are moved along the rollers 81 and 82, they are spun by reason of the rotation of these rollers and as the eggs are so advanced and spun they assume uniform positions as they approach the discharge end of the pair of rollers. Here, as illustrated in Figs. 1 and 8, the eggs assume the uniform positions wherein their long axes are tilted with respect to a plane parallel to and a plane normal to the axes of the pair of rollers 81 and 82. In other words, the long axes of the eggs are tilted rearwardly and upwardly with respect to the roller 81. The discharge end of the roller 81 is provided with a taper preferably having two slopes 110 and 111. This taper 110, 111 operates as the eggs are fed thereacross to tilt the eggs into uniform positions wherein their long axes are included in planes respectively substantially parallel to and normal to the axes of the pair of rollers 81 and 82. In other words, when the eggs leave the tapered portion on the roller 81, they are tilted into uniform positions wherein their long axes are substantially horizontal, parallel and transverse to the pair of rollers 81 and 82.

The eggs are conveyed away from the discharge end of the pair of rollers 81 and 82 by a pair of parallel belts 113 in substantial alignment with the rollers 81 and 82. The pair of belts 113 are supported by a pair of pulleys 114 carried by a shaft 115 journalled in bearings 116 and by a pair of pulleys 117 carried by a shaft 118 journalled in bearings 119. The shaft 118 carries a sprocket wheel 121 which is driven by a chain 122, which in turn is driven by a sprocket wheel 123 carried by a shaft 124 journalled in bearings 125. The shaft 124 carries a bevel gear 126 meshing with a bevel gear 127 driven by the drive shaft 20. Thus, the pair of belts 113, so driven, operate as a conveyor for conveying eggs from the discharge end of the pair of rollers 81 and 82 with the long axes of the eggs horizontal and transverse to the direction of movement.

A pair of ears 130, formed on a bracket 131 secured to the bracket 83, overlie the belts 113 where they course the pulleys 114 so that the eggs discharged from the pair of rollers 81 and 82 are readily applied to the pair of belts 113. Similarly, a pair of ears 132, carried by a bracket 133, overlie the belts 113 where they course the pulleys 117 so that the eggs may be readily discharged from the belts 113. The bracket 133 is secured to a track member 134 having a pair of sloping parallel rails 135. The rails 135 rollingly carry the eggs with their long axes substantially horizontal and transverse to their direction of movement. The eggs thus rollingly supported by the rails 135 of the track, may extend to a candling device, a grader, a breaker or the like, the eggs being uniformly presented to such devices by the track. For example, as shown in Fig. 5, a housing 136, having a light source therein, may be located below the rails 135 so that the eggs uniformly passing over the light source may be readily candled.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. A feeding mechanism for eggs comprising, a pair of cylindrical, parallel and adjacent rollers substantially horizontally arranged and having a supply end and a discharge end, means for rotating the rollers in the same direction, means for supplying eggs onto the pair of rollers at the supply end thereof, means for advancing the eggs along the pair of rollers to the discharge end thereof, the eggs being spun by the pair of rollers as they are advanced therealong and the eggs assuming uniform positions as they approach the discharge end of the pair of rollers wherein their long axes are tilted with respect to a plane parallel to and a plane normal to the axes of the pair of rollers, and one of the rollers being provided at its discharge end with a taper for tilting the eggs as they leave the discharge end of the pair of rollers into uniform positions wherein their long axes are included in planes respectively substantially parallel to and normal to the axes of the pair of rollers.

2. A feeding mechanism for eggs comprising, a pair of cylindrical, parallel and adjacent rollers substantially horizontally arranged and having a supply end and a discharge end, means for rotating the rollers in the same direction, means for supplying eggs onto the pair of rollers at the supply end thereof, means for advancing the eggs along the pair of rollers to the discharge end thereof, the eggs being spun by the pair of rollers as they are advanced therealong and the eggs assuming uniform positions as they approach the discharge end of the pair of rollers wherein their long axes are tilted rearwardly and upwardly with respect to one of the rollers, and said one of the rollers being provided at its discharge end with a taper for tilting the eggs as they leave the discharge end of the pair of rollers into uniform positions wherein their long axes are substantially horizontal and transverse to the pair of rollers.

3. A feeding mechanism for eggs comprising, a pair of cylindrical, parallel and adjacent rollers substantially horizontally arranged and having a supply end and a discharge end, means for rotating the rollers in the same direction, means for supplying eggs onto the pair of rollers at the supply end thereof, means for advancing the eggs along the pair of rollers to the discharge end thereof, the eggs being spun by the pair of rollers as they are advanced therealong and the eggs assuming uniform positions as they approach the discharge end of the pair of rollers wherein their long axes are tilted with respect to a plane parallel to and a plane normal to the axes of the pair of rollers, one of the rollers being provided at its discharge end with a taper for tilting the eggs as they leave the discharge end of the pair of rollers into uniform positions wherein their long axes are included in planes respectively substantially parallel to and normal to the axes of the pair of rollers, a pair of moving belts in substantial alignment with the pair of rollers for conveying eggs from the discharge end of the pair of rollers, and an inclined track including a pair of rails in substantial alignment with the pair of belts for rollingly receiving the eggs conveyed by the pair of belts.

4. A feeding mechanism for eggs comprising, a pair of cylindrical, parallel and adjacent rollers substantially horizontally arranged and having a supply end and a discharge end, means for rotating the rollers in the same direction, means for supplying eggs onto the pair of rollers at the supply end thereof, means for advancing the eggs along the pair of rollers to the discharge end thereof, the eggs being spun by the pair of rollers as they are advanced therealong and the eggs assuming uniform positions as they approach the discharge end of the pair of rollers wherein their long axes are tilted rearwardly and upwardly with respect to one of the rollers, said one of the rollers being provided at its discharge end with a taper for tilting the eggs as they leave the discharge end of the pair of rollers into uniform positions wherein their long axes are substantially horizontal and transverse to the pair of rollers, a pair of moving belts in substantial alignment with the pair of rollers for conveying eggs from the discharge end of the pair of rollers, and an inclined track including a pair of rails in substantial alignment with the pair of belts for rollingly receiving the eggs conveyed by the pair of belts.

5. A feeding mechanism for eggs comprising, a plurality of parallel moving belts forming a moving platform for randomly receiving a plurality of eggs, means including a plurality of pairs of moving parallel belts transversely located at one end of the moving platform belts for receiving eggs therefrom and transversely conveying them in single file, a pair of cylindrical, parallel and adjacent rollers having a discharge end and a supply end adjacent one end of the pair of belts, the pair of belts supplying eggs onto the pair of rollers at the supply end thereof, means for rotating the rollers in the same direction, means for advancing the eggs along the pair of rollers to the discharge end thereof, the eggs being spun by the pair of rollers as they are advanced therealong and the eggs assuming uniform positions as they approach the discharge end of the pair of rollers wherein their long axes are tilted with respect to a plane parallel to and a plane normal to the axes of the pair of rollers, and one of the rollers being provided at its discharge end with a taper for tilting the eggs as they leave the discharge end of the pair of rollers into uniform positions wherein their long axes are included in planes respectively substantially parallel to and normal to the axes of the pair of rollers.

6. A feeding mechanism for eggs comprising, a plurality of parallel moving belts forming a moving platform for randomly receiving a plurality of eggs, means including a plurality of pairs of moving parallel belts transversely located at one end of the moving platform belts for receiving eggs therefrom and transversely conveying them in single file, a pair of cylindrical, parallel and adjacent rollers having a discharge end and a supply end adjacent one end of the pair of belts, the pair of belts supplying eggs onto the pair of rollers at the supply end thereof, means for rotating the rollers in the same direction, means for advancing the eggs along the pair of rollers to the discharge end thereof, the eggs being spun by the pair of rollers as they are advanced therealong and the eggs assuming uniform positions as they approach the discharge end of the pair of rollers wherein their long axes are tilted rearwardly and upwardly with respect to one of the rollers, and said one of the rollers being provided at its discharge end with a taper for tilting the eggs as they leave the discharge end of the pair of rollers into uniform positions wherein their long axes are substantially horizontal and transverse to the pair of rollers.

7. A feeding mechanism for eggs comprising, a plurality of parallel moving belts forming a moving platform for randomly receiving a plurality of eggs, a first pair of parallel belts transversely located at one end of the moving platform belt for receiving eggs therefrom and movable in one direction for conveying the eggs in that direction, a second pair of parallel belts located parallel and adjacent to the first pair of belts and movable in the opposite direction, means at one end of the first and second pairs of parallel belts for transferring eggs from the first pair to the second pair of parallel belts to be conveyed thereby in single file, a pair of cylindrical, parallel and adjacent rollers having a discharge end and a supply end adjacent the other end of the second pair of belts, the second pair of belts supplying eggs onto the pair of rollers at the supply end thereof, means for rotating the rollers in the same direction, means for advancing the eggs along the pair of rollers to the discharge end thereof, the eggs being spun by the pair of rollers as they are advanced therealong and the eggs assuming uniform positions as they approach the discharge end of the pair of rollers wherein their long axes are tilted with respect to a plane parallel to and a plane normal to the axes of the pair of rollers, and one of the rollers being provided at its discharge end with a taper for tilting the eggs as they leave the discharge end of the pair of rollers into uniform positions wherein their long axes are included in planes respectively substantially parallel to and normal to the axes of the pair of rollers.

8. A feeding mechanism for eggs comprising, a plurality of parallel moving belts forming a moving platform for randomly receiving a plurality of eggs, a first pair of parallel belts transversely located at one end of the moving platform belt for receiving eggs therefrom and movable in one direction for conveying the eggs in that direction, a second pair of parallel belts located parallel and adjacent to the first pair of belts and movable in the opposite direction, means at one end of the first and second pairs of parallel belts for transferring eggs from the first pair to the second pair of parallel belts to be conveyed thereby in single file, a pair of cylindrical, parallel and adjacent rollers having a discharge end and a supply end adjacent the other end of the second pair of belts, the second pair of belts supplying eggs onto the pair of rollers at the supply end thereof, means for rotating the rollers in the same direction, means for advancing the eggs along the pair of rollers to the discharge end thereof, the eggs being spun by the pair of rollers as they are advanced therealong and the eggs assuming uniform positions as they approach the discharge end of the pair of rollers wherein their long axes are tilted rearwardly and upwardly with respect to one of the rollers, and said one of the rollers being provided at its discharge end with a taper for tilting the eggs as they leave the discharge end of the pair of rollers into uniform positions wherein their long axes are substantially horizontal and transverse to the pair of rollers.

9. A feeding mechanism for eggs comprising, a plurality of parallel moving belts forming a moving platform for randomly receiving a plurality of eggs, means including a plurality of pairs of moving parallel belts transversely located at one end of the moving platform belts for receiving eggs therefrom and transversely conveying them in single file, a pair of cylindrical, parallel and adjacent rollers having a discharge end and a supply end adjacent one end of the pair of belts, the pair of belts supplying eggs onto the pair of rollers at the supply end thereof, means for rotating the rollers in the same direction, means for advancing the eggs along the pair of rollers to the discharge end thereof, the eggs being spun by the pair of rollers as they are advanced therealong and the eggs assuming uniform positions as they approach the discharge end of the pair of rollers wherein their long axes are tilted with respect to a plane parallel to and a plane normal to the axes of the pair of rollers, one of the rollers being provided at its discharge end with a taper for tilting the eggs as they leave the discharge end of the pair of rollers into uniform positions wherein their long axes are included in planes respectively substantially parallel to and normal to the axes of the pair of rollers, and means including an inclined track having a pair of parallel rails for rollingly receiving the eggs which are discharged from the pair of rollers.

10. A feeding mechanism for eggs comprising, a plurality of parallel moving belts forming a moving platform for randomly receiving a plurality of eggs, means including a plurality of pairs of moving parallel belts transversely located at one end of the moving platform belts for receiving eggs therefrom and transversely conveying them in single file, a pair of cylindrical, parallel and adjacent rollers having a discharge end and a supply end adjacent one end of the pair of belts, the pair of belts supplying eggs onto the pair of rollers at the supply end thereof, means for rotating the rollers in the same direction, means for advancing the eggs along the pair of rollers to the discharge end thereof, the eggs being spun by the pair of rollers as they are advanced therealong and the eggs assuming uniform positions as they approach the discharge end of the pair of rollers wherein their long axes are tilted with respect to a plane parallel to and a plane normal to the axes of the pair of rollers, one of the rollers being provided at its discharge end with a taper for tilting the eggs as they leave the discharge end of the pair of rollers into uniform positions wherein their long axes are included in planes respectively substantially parallel to and normal to the axes of the pair of rollers, a pair of moving belts in substantial alignment with the pair of rollers for conveying eggs from the discharge end of the pair of rollers, and an inclined track including a pair of rails in substantial alignment with the pair of belts for rollingly receiving the eggs conveyed by the pair of belts.

11. A feeding mechanism for eggs comprising, a plurality of parallel moving belts forming a moving platform for randomly receiving a plurality of eggs, a first pair of parallel belts transversely located at one end of the moving platform belt for receiving eggs therefrom and movable in one direction for conveying the eggs in that direction, a second pair of parallel belts located parallel and adjacent to the first pair of belts and movable in the opposite direction, means at one end of the first and second pairs of parallel belts for transferring eggs from the first pair to the second pair of parallel belts to be conveyed thereby in single file, a pair of cylindrical, parallel and adjacent rollers having a discharge end and a supply end adjacent the other end of the second pair of belts, the second pair of belts supplying eggs onto the pair of rollers at the supply end thereof, means for rotating the rollers in the same direction, means for advancing the eggs along the pair of rollers to the discharge end thereof, the eggs being spun by the pair of rollers as they are advanced therealong and the eggs assuming uniform positions as they approach the discharge end of the pair of rollers wherein their long axes are tilted with respect to a plane parallel to and a plane normal to the axes of the pair of rollers, one of the rollers being provided at its discharge end with a taper for tilting the eggs as they leave the discharge end of the pair of rollers into uniform positions wherein their long axes are included in planes respectively substantially parallel to and normal to the axes of the pair of rollers, and means including an inclined track having a pair of parallel rails for rollingly receiving the eggs which are discharged from the pair of rollers.

12. A feeding mechanism for eggs comprising, a plurality of parallel moving belts forming a moving platform for randomly receiving a plurality of eggs, a first pair of parallel belts transversely located at one end of the moving platform belt for receiving eggs therefrom and movable in one direction for conveying the eggs in that direction, a second pair of parallel belts located parallel and adjacent to the first pair of belts and movable in the opposite direction, means at one end of the first and second pairs of parallel belts for transferring eggs from the first pair to the second pair of parallel belts to be conveyed thereby in single file, a pair of cylindrical, parallel and adjacent rollers having a discharge end and a supply end adjacent the other end of the second pair of belts, the second pair of belts supplying eggs onto the pair of rollers at the supply end thereof, means for rotating the rollers in the same direction, means for advancing the eggs along the pair of rollers to the discharge end thereof, the eggs being spun by the pair of rollers as they are advanced therealong and the eggs assuming uniform positions as they approach the discharge end of the pair of rollers wherein their long axes are tilted with respect to a plane parallel to and a plane normal to the axes of the pair of rollers, one of the rollers being provided at its discharge end with a taper for tilting the eggs as they leave the discharge end of the pair of rollers into uniform positions wherein their long axes are included in planes respectively substantially parallel to and normal to the axes of the pair of rollers, a pair of moving belts in substantial alignment with the pair of rollers for conveying eggs from the discharge end of the pair of rollers, and an inclined track including a pair of rails in substantial alignment with the pair of belts for rollingly receiving the eggs conveyed by the pair of belts.

13. A feeding mechanism for eggs comprising, a wide moving platform for randomly receiving a plurality of eggs, a conveyor for receiving eggs from the downstream end of the moving platform for conveying the received eggs in single file, an egg spinning and tilting device for receiving eggs from the downstream end of the conveyor and for moving and tilting the eggs to uniform positions wherein their long axes are substantially horizontal and transverse to the direction of movement, and means including a track having a pair of parallel rails for rollingly receiving the eggs from the spinning and tilting device with their long axes substantially horizontal and transverse to the direction of rolling.

14. A feeding mechanism for eggs comprising, a wide moving platform for randomly receiving a plurality of eggs, a conveyor for receiving eggs from the downstream end of the moving platform for conveying the received eggs in single file, an egg spinning and tilting device for receiving eggs from the downstream end of the conveyor and for moving and tilting the eggs to uniform positions wherein their long axes are substantially horizontal and transverse to the direction of movement, and a conveyor on the downstream end of the spinning and tilting device for receiving and conveying eggs therefrom with the long axes of the eggs substantially horizontal and parallel.

References Cited in the file of this patent

UNITED STATES PATENTS

| | | |
|---|---|---|
| 2,135,778 | Wyland | Nov. 8, 1938 |
| 2,534,362 | Magnusson | Dec. 19, 1950 |